(12) United States Patent
Sugimura et al.

(10) Patent No.: US 12,545,143 B2
(45) Date of Patent: Feb. 10, 2026

(54) ABNORMALITY DETECTION SYSTEM

(71) Applicant: HONDA MOTOR CO., LTD., Tokyo (JP)

(72) Inventors: Kentaro Sugimura, Wako (JP); Shunichiro Sueyoshi, Wako (JP); Tadashi Hayashida, Wako (JP); Manato Kuwabara, Tokyo (JP); Yusuke Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 18/245,370

(22) PCT Filed: Sep. 17, 2020

(86) PCT No.: PCT/JP2020/035298
§ 371 (c)(1),
(2) Date: Mar. 15, 2023

(87) PCT Pub. No.: WO2022/059145
PCT Pub. Date: Mar. 24, 2022

(65) Prior Publication Data
US 2023/0331117 A1 Oct. 19, 2023

(51) Int. Cl.
*H02J 7/00* (2006.01)
*B60L 53/80* (2019.01)
(Continued)

(52) U.S. Cl.
CPC .......... *B60L 58/14* (2019.02); *B60L 53/80* (2019.02); *B60L 58/16* (2019.02); *B60L 2240/549* (2013.01)

(58) Field of Classification Search
CPC .......... B60L 58/14; B60L 58/16; B60L 53/80; B60L 2240/549
(Continued)

(56) References Cited

U.S. PATENT DOCUMENTS

2014/0324262 A1 10/2014 Wen
2016/0068075 A1* 3/2016 Chen .................. B60L 53/65
320/107
(Continued)

FOREIGN PATENT DOCUMENTS

JP 2001-128301 A 5/2001
JP 2003-123848 A 4/2003
(Continued)

OTHER PUBLICATIONS

International Search Report, International Application No. PCT/JP2020/035298, Date of mailing: Dec. 8, 2020, 3 pages.
(Continued)

*Primary Examiner* — Alexis B Pacheco
(74) *Attorney, Agent, or Firm* — Rankin, Hill & Clark LLP

(57) ABSTRACT

An abnormality detection system includes a removable battery and a server. The removable battery has: a detector; a battery side acquisition unit for acquiring measured data that are the data of measured values measured by the detector and acquiring, from an object to be electrically driven, first recognition data for recognizing the object to be electrically driven; and a battery side storage unit. The server has: a server side storage unit for prestoring reference data that are the data acquired when the object to be electrically driven performs a predetermined operation; a server side acquisition unit for acquiring the measured data, the first recognition data, and second recognition data; and an abnormality detection unit for comparing actual work data obtained from the measured data with the reference data and detecting an abnormality when the difference between the actual work data and the reference data exceeds a threshold value.

20 Claims, 12 Drawing Sheets

(51) Int. Cl.
  *B60L 58/14* (2019.01)
  *B60L 58/16* (2019.01)
  *H02J 7/14* (2006.01)
(58) Field of Classification Search
  USPC .......................................................... 320/134
  See application file for complete search history.

(56) References Cited

U.S. PATENT DOCUMENTS

| | | |
|---|---|---|
| 2016/0267579 A1 | 9/2016 | Toya |
| 2018/0222343 A1 | 8/2018 | Uchida |
| 2019/0207397 A1* | 7/2019 | Lai .......................... B60L 53/68 |
| 2019/0207398 A1* | 7/2019 | Shih ........................ B60L 53/53 |
| 2020/0009990 A1 | 1/2020 | Shiiiama et al. |
| 2020/0164760 A1* | 5/2020 | Sohmshetty ............ B60L 53/66 |
| 2021/0316633 A1* | 10/2021 | Kalligeros .............. B60L 58/12 |
| 2022/0320881 A1* | 10/2022 | Zaitsu ..................... B60L 53/12 |
| 2022/0383402 A1* | 12/2022 | Takemura ............... B60L 53/66 |
| 2023/0015794 A1* | 1/2023 | Liao .................. G07C 9/00309 |
| 2023/0331117 A1* | 10/2023 | Sugimura ........... H02J 7/00032 |
| 2023/0365022 A1* | 11/2023 | Ikui ........................ H02J 7/005 |
| 2023/0411728 A1* | 12/2023 | Iwasa ................ H01M 10/633 |

FOREIGN PATENT DOCUMENTS

| | | |
|---|---|---|
| JP | 2008-312396 A | 12/2008 |
| JP | 2012-79553 A | 4/2012 |
| JP | 2015-504570 A | 2/2015 |
| JP | 2015-047917 A | 3/2015 |
| JP | 2016-033816 A | 3/2016 |
| JP | 2016-170771 A | 9/2016 |
| JP | 2017-117532 A | 6/2017 |
| JP | 2018-128769 A | 8/2018 |
| JP | 2018-160364 A | 10/2018 |
| JP | 2020-53202 A | 4/2020 |

OTHER PUBLICATIONS

Japanese Office Action, Japanese Patent Application No. 550272/2022, English translation included, 14 pages.
Japanese Office Action issued Oct. 17, 2023 in corresponding Japanese application No. 2022-550272; English translation included (12 pages).

* cited by examiner

ABNORMALITY DETECTION SYSTEM

TECHNICAL FIELD

The present invention relates to an abnormality detection system that detects an abnormality in an electric object or in a detachable battery mounted in an electric object.

BACKGROUND ART

JP 2016-033816 A discloses an apparatus that detects an abnormality in a drive system including an electric energy source (battery) mounted in an unmanned transport vehicle. In this apparatus, the unmanned transport vehicle travels along a prescribed loop course in a container terminal at a harbor. Furthermore, the unmanned transport vehicle acquires various types of data and transmits the acquired data to a control tower in the container terminal at the harbor. The control tower determines whether there is an abnormality, based on the received data.

SUMMARY OF THE INVENTION

Electric objects (electric vehicles, electric construction machines, electric work machines, and the like) mounted with a battery are used at various locations. In a case where the technology of JP 2016-033816 A is used for a plurality of electric objects that are used over a wide area, each electric object must have a function to acquire data and a function to transmit the acquired data to the outside. When an electric object is provided with such functions, the configuration of the electric object becomes complicated, and the manufacturing cost of the electric object is increased.

The present invention has been devised in order to solve this type of problem, and has the object of providing an abnormality detection system that can, with a simple configuration, detect an abnormality in an electric object or in a detachable battery mounted in an electric object.

An aspect of the present invention is an abnormality detection system that detects an abnormality in an electric object or a detachable battery that is attachable to and detachable from the electric object, the abnormality detection system comprising a server provided separately from the electric object, wherein the detachable battery includes: a detecting unit; a battery-side acquiring section configured to acquire measurement data, which is data of a measurement value measured by the detecting unit, and also acquire, from the electric object, first identification data for identifying the electric object; and a battery-side storage section configured to store the measurement data and the first identification data in a linked manner, and also store second identification data for identifying the detachable battery, and the server includes: a server-side storage section configured to store in advance reference data, which is data acquired when the electric object performs a prescribed operation; a server-side acquiring section configured to acquire the measurement data, the first identification data, and the second identification data; and an abnormality detecting section configured to compare actual work data obtained from the measurement data to the reference data, and detect an abnormality if a difference between the actual work data and the reference data exceeds a threshold value.

According to the present invention, an abnormality in an electric object or an abnormality in a detachable battery mounted in the electric object can be detected with a simple configuration.

DETAILED DESCRIPTION OF THE INVENTION

The following provides a detailed description of examples of a preferred embodiment of an abnormality detection system according to the present invention, while referencing the accompanying drawings.

1. CONFIGURATION OF ABNORMALITY DETECTION SYSTEM 10

Figure 1:
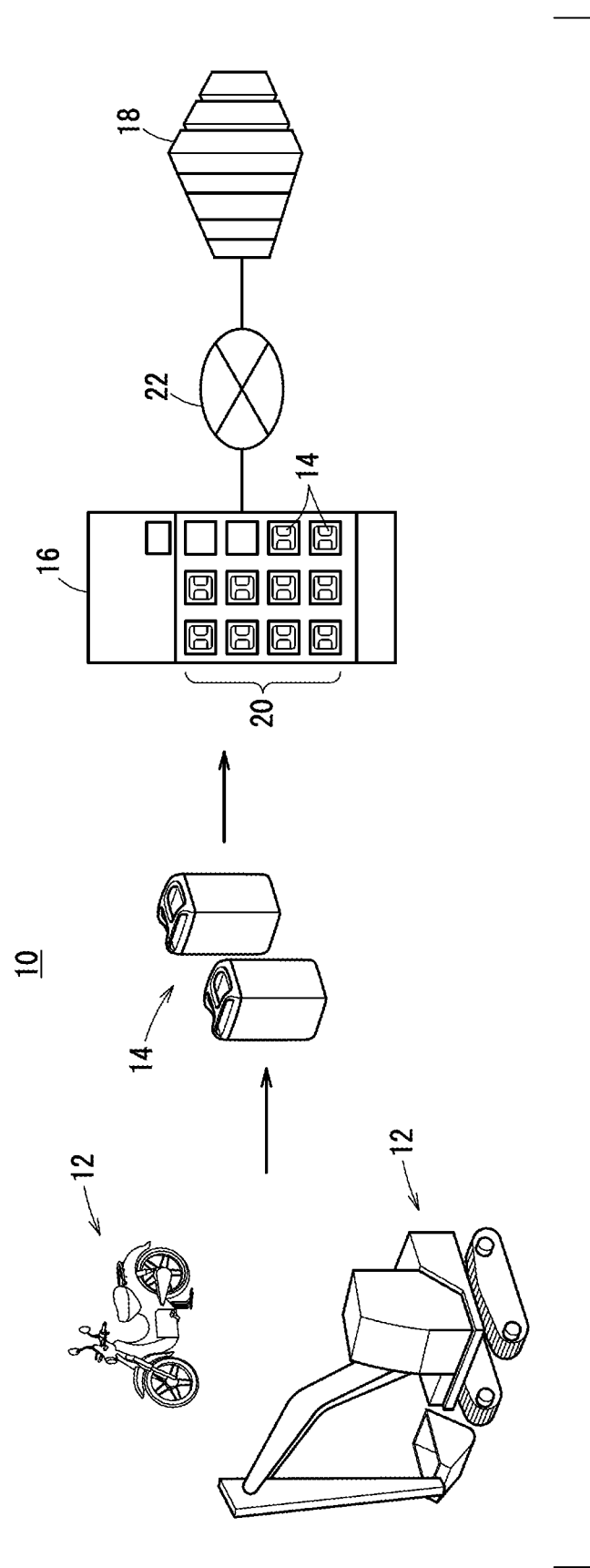
FIG. 1 is an overall configurational view of an abnormality detection system according to an embodiment of the present invention.
Figure 2:
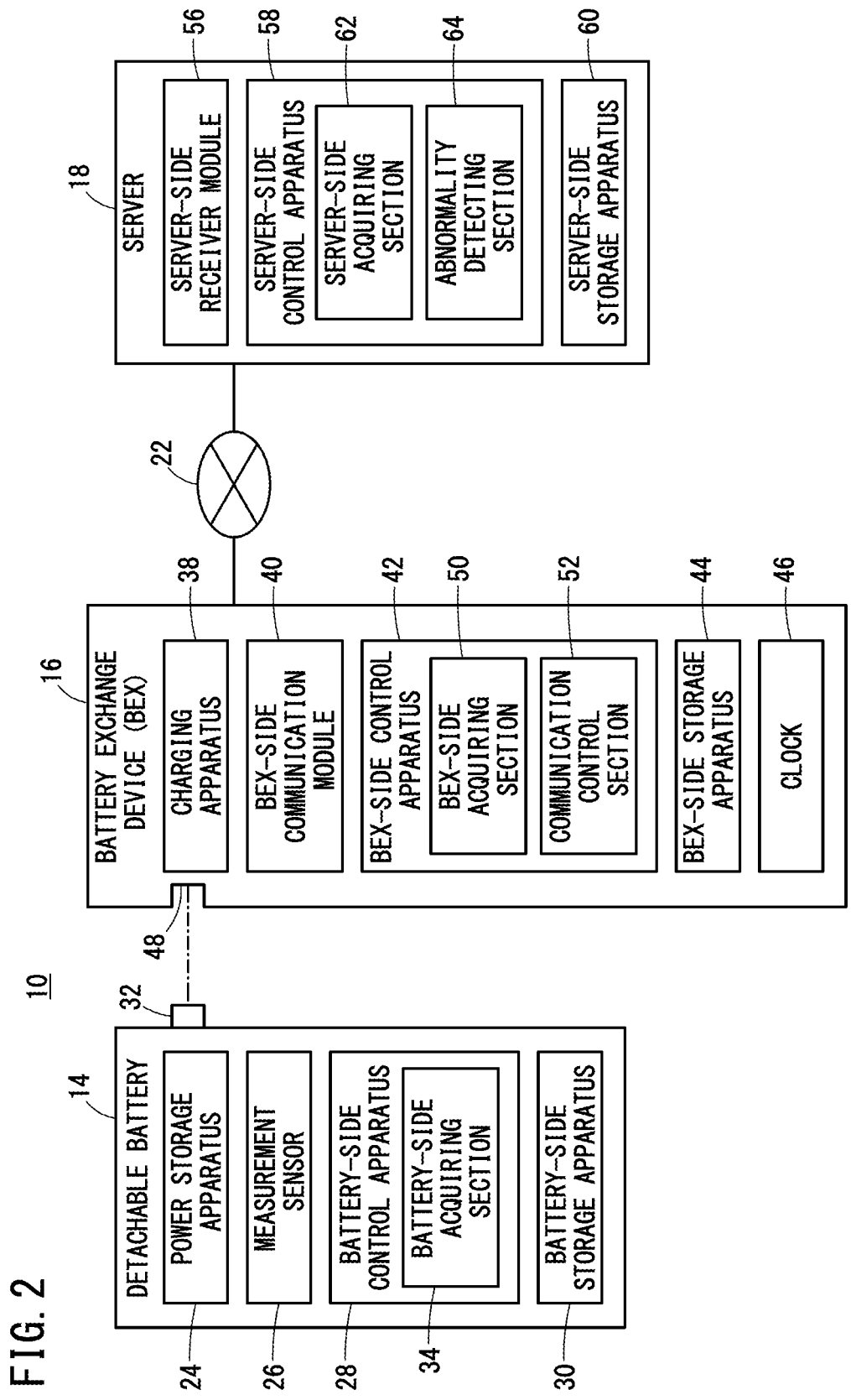
FIG. 2 is a block diagram of the abnormality detection system shown in FIG. 1.

FIG. 1 is an overall configurational view of an abnormality detection system 10 according to an embodiment of the present invention. FIG. 2 is a block diagram of the abnormality detection system 10 shown in FIG. 1.

As shown in FIG. 1, the abnormality detection system 10 is a system that is capable of providing a sharing service through which a plurality of users share a detachable battery 14, which is a drive source of an electric object 12. As an example, the electric object 12 is an electric vehicle (two-wheeled vehicle, three-wheeled vehicle, or four-wheeled vehicle), an electric construction machine, an electric working machine, or the like equipped with an electric power unit (not shown in the drawings) capable of operating with electric power. The electric power unit includes the detachable battery 14, an electric motor, a control circuit, and the like.

The abnormality detection system 10 includes one or more detachable batteries 14, one or more battery exchange devices (holding apparatuses) 16, and a server 18. The detachable battery 14 is a cassette-type battery equipped in a detachable manner to the electric power unit of the electric object 12. The detachable battery 14 may be provided in a detachable manner to the electric object 12, instead of the electric power unit. The battery exchange device 16 is a holding apparatus that holds a plurality of the detachable batteries 14, and also is a charger that charges the plurality of detachable batteries 14. The battery exchange device 16 includes a plurality of slots (holding units) 20 for holding the plurality detachable batteries 14. The battery exchange device 16 is installed at each of a plurality of locations. The server 18 is a management apparatus that centrally manages the usage status and deterioration status of each detachable battery 14. The battery exchange device 16 is connected to the server 18 via a network 22, in a manner enabling communication.

2. CONFIGURATION OF DETACHABLE BATTERY 14

As shown in FIG. 2, the detachable battery 14 includes a power storage apparatus 24, a measurement sensor (detecting unit) 26, a battery-side control apparatus 28, a battery-side storage apparatus 30, and a battery-side connecting section 32.

The power storage apparatus 24 is a battery pack that includes a secondary battery (lithium-ion battery or lead-acid battery) and is formed by a plurality of cells that can be charged with power and discharge power. The power storage apparatus 24 may have another configuration, and may be another type of secondary battery, capacitor, or a composite battery made by combining these components.

The measurement sensor 26 is formed by one or more sensors that measure prescribed measurement items such as, for example, voltage, current, and temperature of the power storage apparatus 24 or the acceleration (gravitational acceleration) experienced by the detachable battery 14. The measurement sensor 26 outputs data indicating the measured values to the battery-side control apparatus 28.

The battery-side control apparatus 28 includes a processor such as a CPU, and performs charge/discharge control of the detachable battery 14 and data management. The battery-side control apparatus 28 functions as a battery-side acquiring section 34 by executing a program stored in the battery-side storage apparatus 30.

The battery-side acquiring section 34 acquires first identification data from the electric object 12. The first identification data is unique data assigned to each individual electric object 12, and is ID data, for example. Furthermore, the battery-side acquiring section 34 acquires measurement data based on measurement value data output by the measurement sensor 26. The measurement value data can be used as-is as the measurement data, or a value calculated from the measurement value can be used as the measurement data. As an example, data concerning the SOC, the highest temperature or lowest temperature of the cell, a current value, a pack voltage value, a cell voltage value, the movement speed of the electric object 12, the acceleration (gravitational acceleration) experienced by the detachable battery 14, and the like can be the measurement data.

The battery-side storage apparatus 30 includes a RAM, a ROM, and the like, for example, and stores various types of data. The battery-side storage apparatus 30 stores the first identification data and the measurement data acquired by the battery-side control apparatus 28. The battery-side control apparatus 28 stores the measurement data as time-series data. Furthermore, the battery-side storage apparatus 30 stores second identification data. The second identification data is unique data assigned to each individual detachable battery 14, and is ID data, for example.

The battery-side control apparatus 28 and the battery-side storage apparatus 30 are formed as a unit. This is referred to as a battery management unit (BMU).

The battery-side connecting section 32 is a connecting section on the battery side for electrically connecting the detachable battery 14 to the battery exchange device 16, and the detachable battery 14 to the electric power unit (or electric object 12). The battery-side connecting section 32 includes a connector for charging and discharging, and a terminal for data communication.

3. CONFIGURATION OF BATTERY EXCHANGE DEVICE 16

In this specification, the battery exchange device 16 is also referred to as a BEX. As shown in FIG. 2, the battery exchange device 16 includes a charging apparatus 38, a BEX-side communication module (communicating section) 40, a BEX-side control apparatus 42, a BEX-side storage apparatus (holding-apparatus-side storage section) 44, a clock 46, and a BEX-side connecting section 48.

The charging apparatus 38 is a device that charges the detachable battery 14, in a state where the battery-side connecting section 32 and the BEX-side connecting section 48 are electrically connected. The charging apparatus 38 is connected to a power supply (not shown in the drawings) for supplying power to the detachable battery 14.

The BEX-side communication module 40 is connected to the network 22 wirelessly or by a wire. The BEX-side communication module 40 is a module that includes a communication device enabling communication with an external apparatus via the network 22.

The BEX-side control apparatus 42 includes a processor such as a CPU, and performs charging control of the detachable battery 14 and data management. The BEX-side control apparatus 42 functions as a BEX-side acquiring section (holding-apparatus-side acquiring section) 50 and a communication control section 52 by executing a program stored in the BEX-side storage apparatus 44.

The BEX-side acquiring section 50 acquires first time data and second time data from the clock 46. The first time data is data indicating the date and time measured at a timing when the detachable battery 14 is removed (rented out) from the slot 20 of the battery exchange device 16. The second time data is data indicating the date and time measured at a timing when the detachable battery 14 is loaded in (returned to) the slot 20 of the battery exchange device 16. Furthermore, the BEX-side acquiring section 50 acquires the first identification data, the second identification data, and the measurement data from the detachable battery 14 in a state where the detachable battery 14 and the battery exchange device 16 are electrically connected to each other.

The communication control section 52 transmits various types of data stored in the BEX-side storage apparatus 44 to the server 18, using the BEX-side communication module 40.

The BEX-side storage apparatus 44 includes a RAM, a ROM, and the like, for example, and stores various types of data. The BEX-side storage apparatus 44 stores the first time data, the second time data, the first identification data, the second identification data, and the measurement data acquired by the BEX-side acquiring section 50.

The BEX-side connecting section 48 is a connecting section on the BEX side for electrically connecting the detachable battery 14 to the battery exchange device 16. The BEX-side connecting section 48 includes a connector for charging, and a terminal for data communication.

4. CONFIGURATION OF SERVER 18

As shown in FIG. 2, the server 18 includes a server-side receiver module 56, a server-side control apparatus 58, and a server-side storage apparatus 60.

The server-side receiver module 56 is connected to the network 22 wirelessly or by a wire. The server-side receiver module 56 is a module that includes a receiver enabling the reception of data from an external apparatus via the network 22.

The server-side control apparatus 58 includes a processor such as a CPU, and performs data management. The server-side control apparatus 58 functions as a server-side acquiring section 62 and an abnormality detecting section 64 by executing a program stored in the server-side storage apparatus 60.

The server-side acquiring section 62 acquires the first time data, the second time data, the first identification data, the second identification data, and the measurement data from the battery exchange device 16, via the server-side receiver module 56.

The abnormality detecting section 64 compares actual work data acquired from the measurement data to reference data, and detects an abnormality if a difference between the actual work data and the reference data exceeds a threshold value. The actual work data may be the same data as the measurement data, for example, or may be data obtained based on the measurement data. The reference data is data acquired when a normal electric object 12 mounted with a normal electric power unit performs a prescribed operation. The prescribed operation is a preset operation that is performed during the general usage of the electric object 12. As an example, the reference data includes data of the average value of the measurement value (discharge current value, acceleration, or the like) acquired during the prescribed operation.

The server-side storage apparatus 60 includes a RAM, a ROM, and the like, for example, and stores various types of data. The server-side storage apparatus 60 stores the first time data, the second time data, the first identification data, the second identification data, and the measurement data acquired by the server-side acquiring section 62. Furthermore, the server-side storage apparatus 60 stores in advance reference data of each electric object 12. The server-side storage apparatus 60 stores various threshold values used when detecting abnormalities. The reference data and the various threshold values stored in the server-side storage apparatus 60 can be changed as needed by an operator on the server 18 side using an input apparatus (not shown in the drawings) such as a keyboard or a mouse.

5. VARIOUS PROCESSES PERFORMED BY ABNORMALITY DETECTION SYSTEM 10

In one aspect of the abnormality detection system 10 of the present embodiment, the detachable battery 14 is shared by a plurality of users. Users repeatedly rent and return the detachable battery 14. As an example, the user removes the charged detachable battery 14 from the battery exchange device 16 and attaches the detachable battery 14 to the electric object 12 (rental). Further, the user removes the used detachable battery 14 from the electric object 12, and loads the detachable battery 14 in the battery exchange device 16 (return). The used detachable battery 14 and the charged detachable battery 14 may be the same, or may be different from each other.

5.1. Process Performed by Detachable Battery 14

Figure 3:
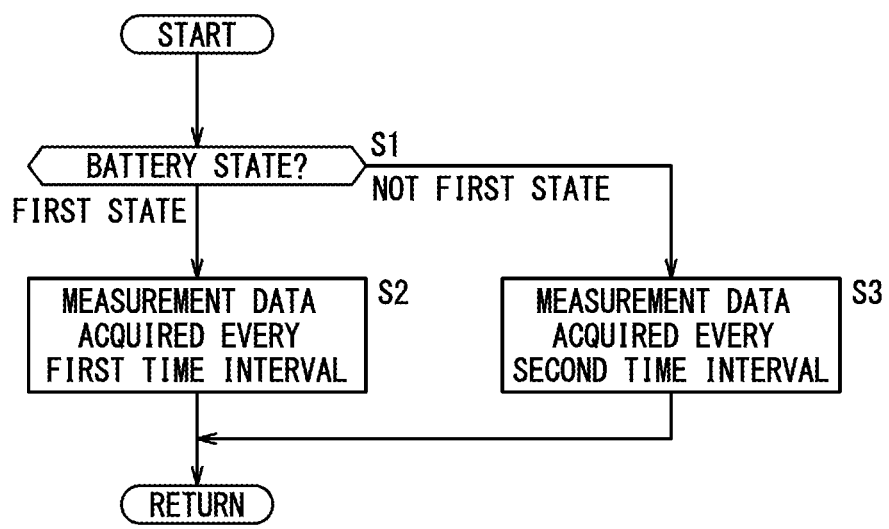
FIG. 3 is a flow chart of a process performed by a detachable battery.

FIG. 3 is a flow chart of a process performed by the detachable battery 14. The process shown in FIG. 3 is performed at prescribed time intervals.

At step S1, the battery-side acquiring section 34 determines the state of the detachable battery 14. The battery-side acquiring section 34 determines a first state when it is detected that the battery-side connecting section 32 and the electric power unit of the electric object 12 are electrically connected. In the case of the first state (step S1: FIRST STATE), the process moves to step S2. On the other hand, the battery-side acquiring section 34 determines a second state when it is detected that the battery-side connecting section 32 and the BEX-side connecting section 48 are electrically connected. Furthermore, the battery-side acquiring section 34 determines a third state when it is detected that the battery-side connecting section 32 is not electrically connected to any external device. In the case of the second state or the third state (step S1: NOT FIRST STATE), the process moves to step S3.

At step S2, the battery-side acquiring section 34 acquires measurement data every first time interval. At this time, the battery-side acquiring section 34 acquires the measurement data based on the measurement value of the measurement sensor 26.

At step S3, the battery-side acquiring section 34 acquires the measurement data every second time interval. At this time, the battery-side acquiring section 34 acquires the measurement data based on the measurement value of the measurement sensor 26. The first time interval is shorter than the second time interval. In other words, the battery-side acquiring section 34 gathers a larger amount of measurement data when the battery-side connecting section 32 is attached to the electric power unit of the electric object 12.

The battery-side acquiring section 34 acquires the first identification data from the electric object 12 mounted with the electric power unit when the battery-side connecting section 32 and the electric power unit or the battery-side connecting section 32 and the electric object 12 are electrically connected.

5.2. First Process Performed by Battery Exchange Device 16

Figure 4:
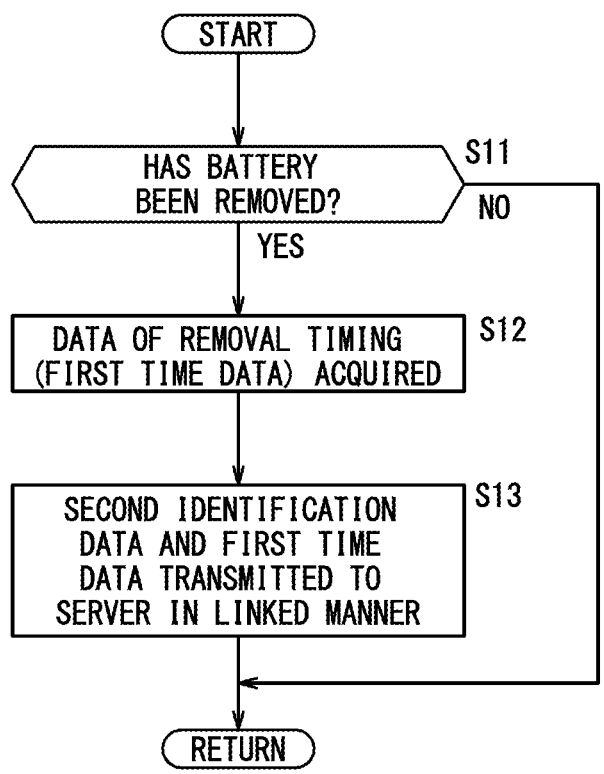
FIG. 4 is a flow chart of a first process performed by a battery exchange device.

FIG. 4 is a flow chart of a first process performed by the battery exchange device 16. The process shown in FIG. 4 is performed at prescribed time intervals. Within the process shown in FIG. 4, the processing of step S12 and step S13 is performed when the charged detachable battery 14 is removed (rented out) from the battery exchange device 16.

At step S11, the BEX-side acquiring section 50 determines whether the detachable battery 14 has been removed from the slot 20. The BEX-side acquiring section 50 determines that the detachable battery 14 has been removed from the slot 20 when it is detected that the BEX-side connecting section 48 and the battery-side connecting section 32 have changed from a state of being electrically connected to a state of not being electrically connected. If the detachable battery 14 has been removed from the slot 20 (step S11: YES), the process moves to step S12. On the other hand, if the detachable battery 14 has not been removed from the slot 20 (step S11: NO), the process ends for now.

At step S12, the BEX-side acquiring section 50 acquires the first time data, which is the data of the timing of the removal of the detachable battery 14, from the clock 46, and stores this first time data in the BEX-side storage apparatus 44. At step S13, the communication control section 52 transmits the first time data and the second identification data of the removed detachable battery 14 in a linked manner, to the server 18.

5.3. Second Process Performed by Battery Exchange Device 16

Figure 5:
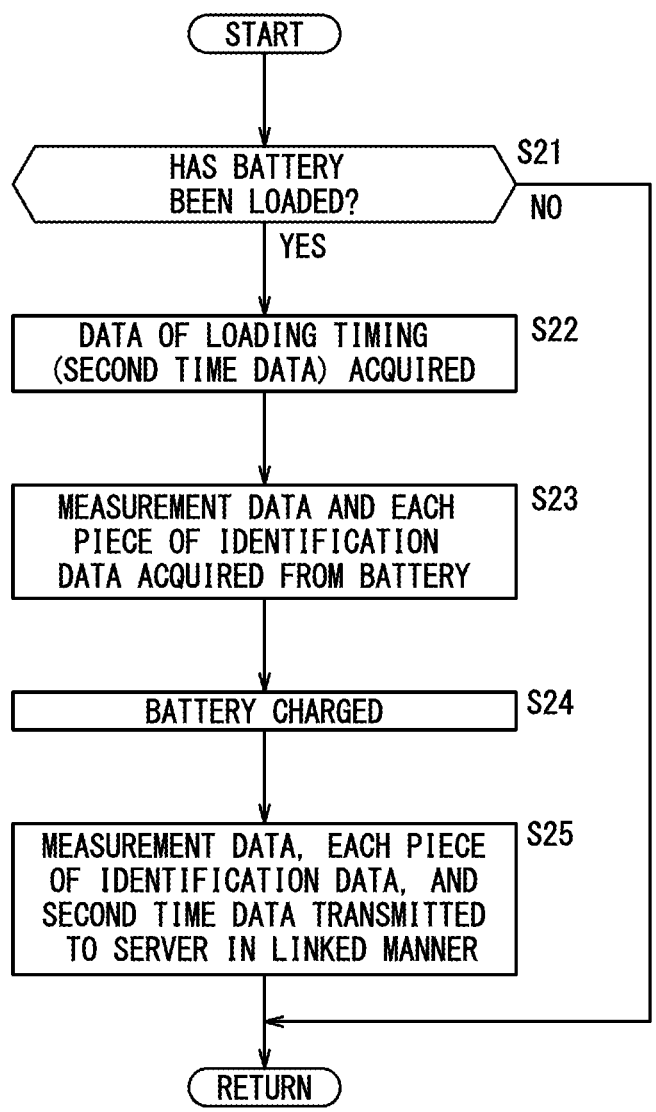
FIG. 5 is a flow chart of a second process performed by the battery exchange device.

FIG. 5 is a flow chart of a second process performed by the battery exchange device 16. The process shown in FIG. 5 is performed at prescribed time intervals, and is performed in parallel with the process shown in FIG. 4. Within the process shown in FIG. 5, the processing of steps S22 to S25 is performed when the used detachable battery 14 is loaded in (returned to) the battery exchange device 16.

At step S21, the BEX-side acquiring section 50 determines whether the detachable battery 14 is loaded in the slot 20. The BEX-side acquiring section 50 determines that the detachable battery 14 is loaded in the slot 20 when it is detected that the BEX-side connecting section 48 and the battery-side connecting section 32 change from a state of not being electrically connected to a state of being electrically connected. If the detachable battery 14 is loaded in the slot 20 (step S21: YES), the process moves to step S22. On the other hand, if the detachable battery 14 is not loaded in the slot 20 (step S21: NO), the process ends for now.

At step S22, the BEX-side acquiring section 50 acquires the second time data, which is the data of the timing of the loading of the detachable battery 14, from the clock 46, and stores this second time data in the BEX-side storage apparatus 44. At step S23, the BEX-side acquiring section 50 acquires the first identification data, the second identification data, and the measurement data from the detachable battery 14, and stores the data in the BEX-side storage apparatus 44. At step S24, the charging apparatus 38 starts charging the detachable battery 14.

At step S25, the communication control section 52 transmits the first identification data, the second identification data, the measurement data, and the second time data in a linked manner, to the server 18.

5.4. Process Performed by Server 18

At step S13 in FIG. 4, if the second identification data and the first time data transmitted from the battery exchange device 16 have been received, the server-side acquiring section 62 stores the second identification data and the first time data in the server-side storage apparatus 60.

Figure 6:
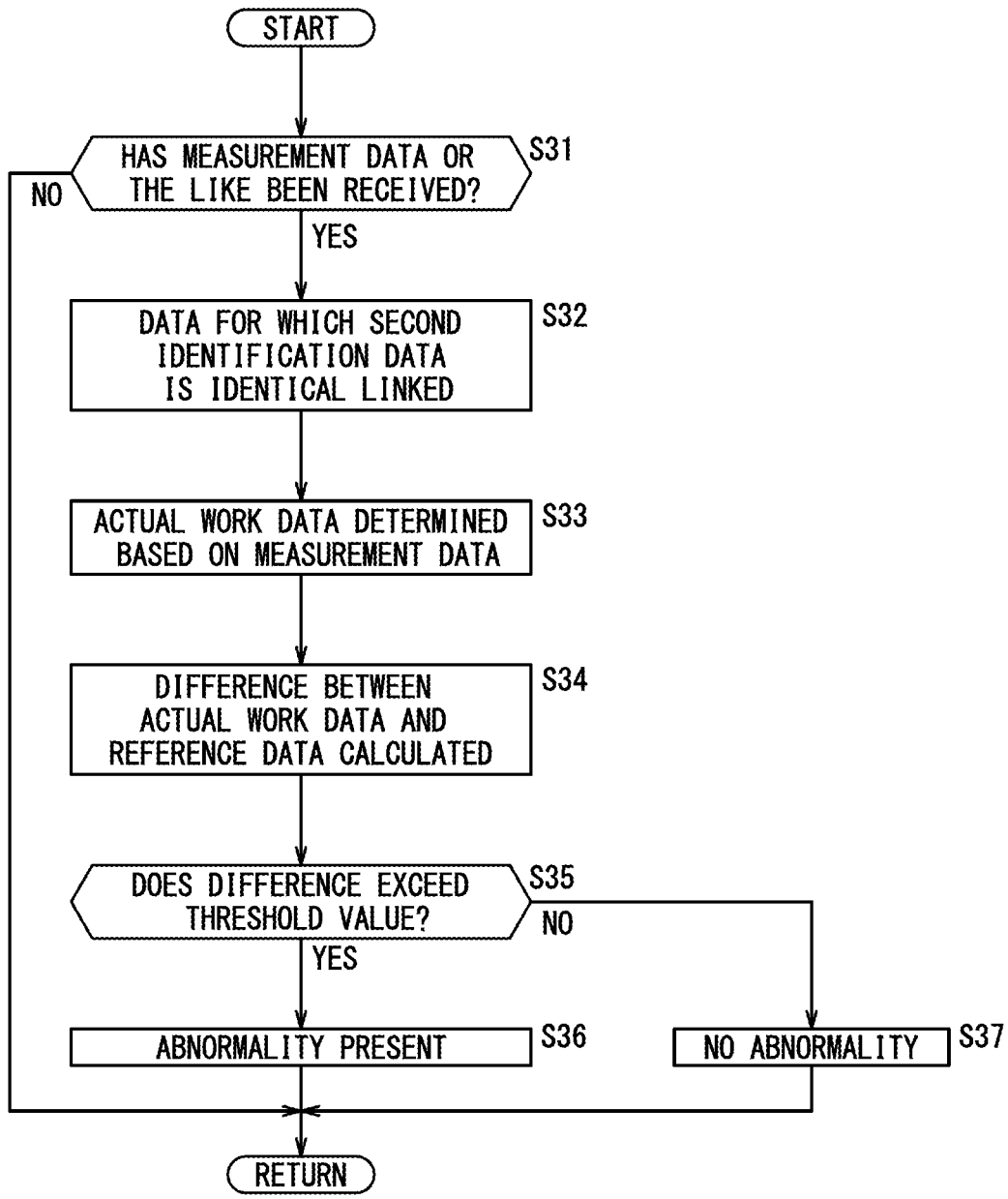
FIG. 6 is a flow chart of a process performed by a server.

FIG. 6 is a flow chart of a process performed by the server 18. The process shown in FIG. 6 is performed at prescribed time intervals.

At step S31, the server-side acquiring section 62 determines whether the server-side receiver module 56 has received the first identification data, the second identification data, the measurement data, and the second time data. If the server-side receiver module 56 has received each piece of the above data (step S31: YES), the process moves to step S32. On the other hand, if the server-side receiver module 56 has not received each piece of the above data (step S31: NO), the process ends for now.

At step S32, the server-side acquiring section 62 links together respective pieces of data for which the second identification data is identical. Specifically, the server-side acquiring section 62 links the first time data transmitted from the battery exchange device 16 in step S13 of FIG. 4 with the first identification data, the second identification data, the measurement data, and the second time data received in step S31. The server-side acquiring section 62 stores the various types of linked data in the server-side storage apparatus 60. That is, the server-side storage apparatus 60 stores the ID of the detachable battery 14, the ID of the electric object 12 that has used the detachable battery 14, the rental date and time and the return date and time of the detachable battery 14, and the time-series measurement data during the rental. The data stored here is referred to as history data.

At step S33, the abnormality detecting section 64 determines the actual work data to be used in the abnormality detection process, based on the measurement data included in the history data stored in the server-side storage apparatus 60. A specific example of a method for determining the actual work data to be used in the abnormality detection process and a specific example of a method for detecting an abnormality are described below in section [6].

At step S34, the abnormality detecting section 64 compares the actual work data to the reference data, and calculates the difference therebetween. A specific example of the process performed here is described below in section [6].

At step S35, the abnormality detecting section 64 determines whether the difference calculated in step S34 exceeds a threshold value corresponding to the data. If the difference exceeds the threshold value (step S35: YES), the process moves to step S36. On the other hand, if the difference does not exceed the threshold value (step S35: NO), the process moves to step S37.

At step S36, the abnormality detecting section 64 determines that there is an abnormality in the detachable battery 14 or the electric object 12. In this case, the abnormality detecting section 64 appends an abnormality code indicating that an abnormality has been detected to the history data, and stores this data in the server-side storage apparatus 60. Since the history data includes the first identification data and the second identification data, the abnormality detecting section 64 can identify the electric object 12 or detachable battery 14 that is possibly experiencing the abnormality. Furthermore, since the history data includes the first time data and the second time data, and also includes the time-series measurement data, the abnormality detecting section 64 can identify the time at which the abnormality occurred.

At step S37, the abnormality detecting section 64 determines that there is no abnormality in the detachable battery 14 and the electric object 12.

The processing of steps S31 to S37 may be performed in series, or the processing of steps S33 to S37 may be performed some time after the processing of steps S31 and S32. In a case where the processing of steps S31 and S32 and the processing of steps S33 to S37 are performed separately, the processing of steps S31 and S32 is performed at prescribed time intervals.

6. SPECIFIC EXAMPLES OF ABNORMALITY DETECTION PROCESS

The following describes specific examples of the processing of steps S33 to S35 shown in FIG. 6.

6.1. Specific Example 1

The abnormality detecting section 64 determines data of the discharge current value included in the measurement data to be the actual work data. The abnormality detecting section 64 compares the actual work data (discharge current value data) to the reference data (discharge current value data), and calculates a current difference Id that is the difference between these pieces of data. The abnormality detecting section 64 then determines that there is an abnormality if the current difference Id exceeds a current threshold value Ith.

6.2. Specific Example 2

In Specific Example 2, the detachable battery 14 is attached to the electric object 12 that performs a rated operation. The electric object 12 performing the rated operation is an electric work machine such as a power trowel or high-pressure washer that performs an operation (work) with a constant load, for example.

Figure 7:
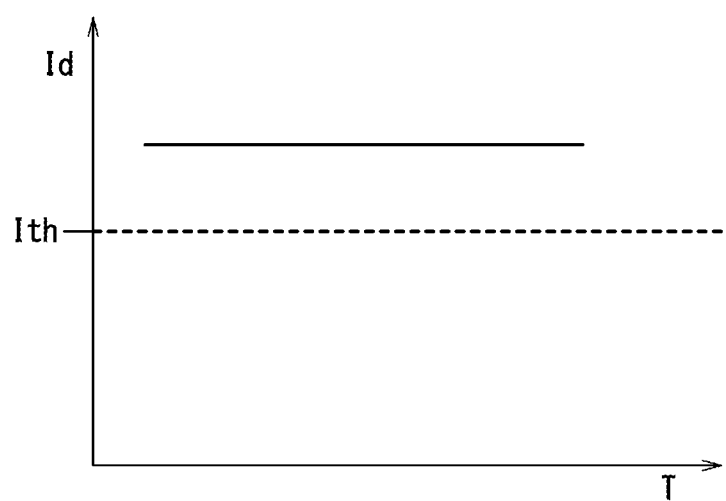
FIG. 7 shows a relationship between a current difference, between actual work data and reference data, and the time.

FIG. 7 shows a relationship between the current difference Id, between the actual work data and the reference data, and the time T. The electric motor of the electric object 12 that performs the rated operation has little fluctuation in the rotational speed, and little fluctuation in the discharge current value. Therefore, the actual work data in time series is approximately constant. Accordingly, as shown in FIG. 7, the current difference Id is approximately constant at each time. In Specific Example 2, the same process as in Specific Example 1 is performed.

6.3. Specific Example 3

In Specific Example 3, the detachable battery 14 is attached to the electric object 12 that performs a specified operation. The electric object 12 performing the specified operation is an electric working machine performing operations (work) in which the load varies linearly, such as an electric power shovel that repeatedly performs excavation and turning operations, or an electric vehicle such as an electric motorcycle that repeatedly performs acceleration and deceleration operations, for example. The specified operation is included in the prescribed operation to be executed by the electric object 12 when acquiring the reference data. The reference data acquired when the electric object 12 is performing the specified operation is also referred to as specified measurement data.

While performing the specified operation, the electric object 12 outputs, to the detachable battery 14, a signal indicating that the specified operation is being performed. The battery-side acquiring section 34 appends an ID of the specified operation to the measurement data acquired when this signal is detected, and stores the measurement data and the ID in the battery-side storage apparatus 30.

In steps S33 to S35, the following processing is performed. The abnormality detecting section 64 determines the data of the discharge current value included in the measurement data to be the actual work data. The abnormality detecting section 64 compares the actual work data (discharge current value data) having the ID of the specified operation appended thereto to the specified measurement data (discharge current value data), and calculates the current difference Id that is the difference between these pieces of data. The abnormality detecting section 64 then determines that there is an abnormality if the current difference Id exceeds the current threshold value Ith.

An operational mode of the electric object 12 may be capable of being set, and a measurement mode in which the specified operation is performed may be included as the operational mode. In this case, the user can select the measurement mode. When the user has selected the measurement mode, the electric object 12 performs the specified operation.

6.4. Specific Example 4

Figure 8A:
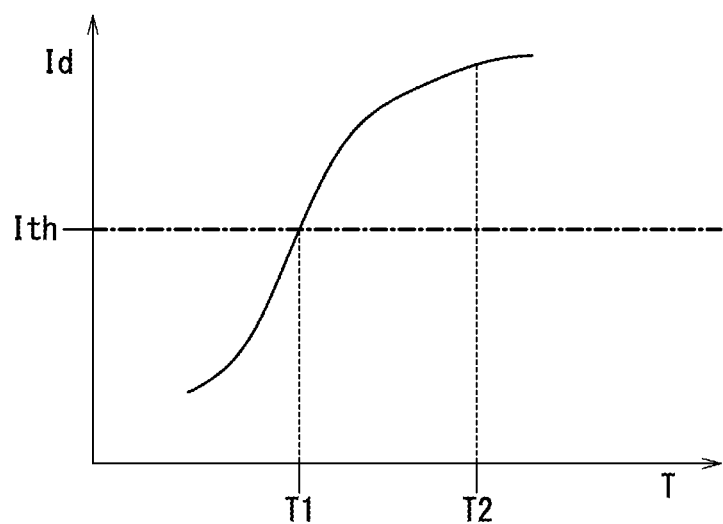
FIG. 8A shows a relationship between the current difference, between the actual work data and the reference data, and the time.
Figure 8B:
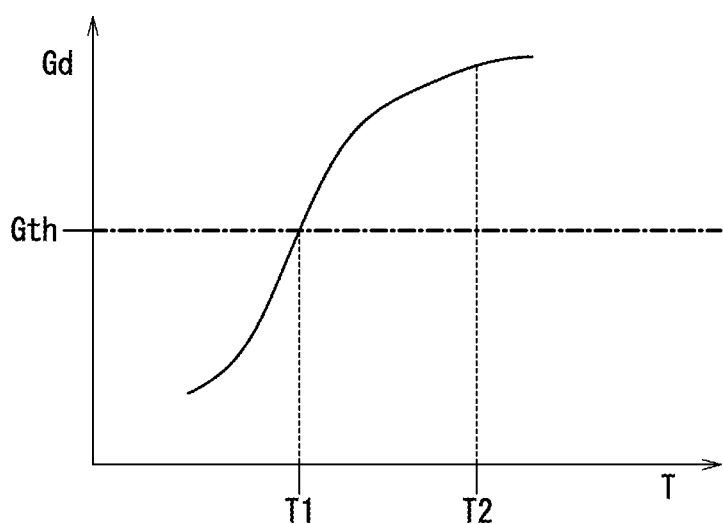
FIG. 8B shows a relationship between an acceleration difference, between the actual work data and the reference data, and the time.

FIG. 8A shows a relationship between the current difference Id, between the actual work data and the reference data, and the time T. FIG. 8B shows a relationship between an acceleration difference Gd, between the actual work data and the reference data, and the time T.

The abnormality detecting section 64 determines the data of the discharge current value and the data of the acceleration that are included in the measurement data, to be the actual work data. The abnormality detecting section 64 compares the actual work data (discharge current value data) to the reference data (discharge current value data), and calculates the current difference Id that is the difference between these pieces of data. Furthermore, the abnormality detecting section 64 compares the actual work data (acceleration data) to the reference data (acceleration data), and calculates the acceleration difference Gd that is the difference between these pieces of data. The abnormality detecting section 64 then determines that there is an abnormality if there is a time (for example, the times T1 and T2 in FIGS. 8A and 8B) at which the current difference Id exceeds the current threshold value Ith and the acceleration difference Gd exceeds an acceleration threshold value Gth.

The acceleration data included in the measurement data fluctuates over time. In such a case, along with using the absolute value of the acceleration, a moving average may be calculated and the calculated average value may be used as the acceleration data. The same is true in other examples.

6.5. Specific Example 5

The abnormality detecting section 64 determines the elapsed time from when the acceleration experienced by the detachable battery 14 becomes greater than or equal to the prescribed acceleration to when the discharge current value of the detachable battery 14 becomes greater than or equal to the prescribed current value, to be the actual work data. The abnormality detecting section 64 calculates this elapsed time based on the discharge current value data and the acceleration data that are included in the measurement data. The abnormality detecting section 64 compares the actual work data (elapsed time data) to the reference data (elapsed time data), and calculates an elapsed time difference Td that is the difference between these pieces of data. The abnormality detecting section 64 then determines that there is an abnormality if the elapsed time difference Td exceeds a time threshold value.

6.6. Specific Example 6

Figure 9A:
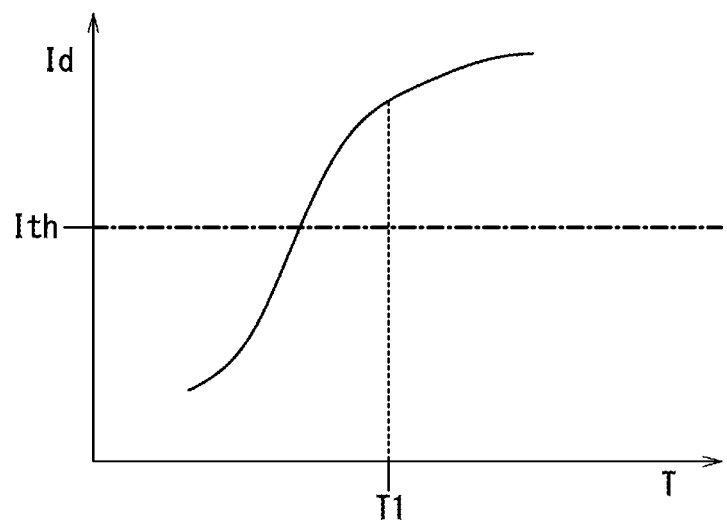
FIG. 9A shows a relationship between the current difference, between the actual work data and the reference data, and the time.
Figure 9B:
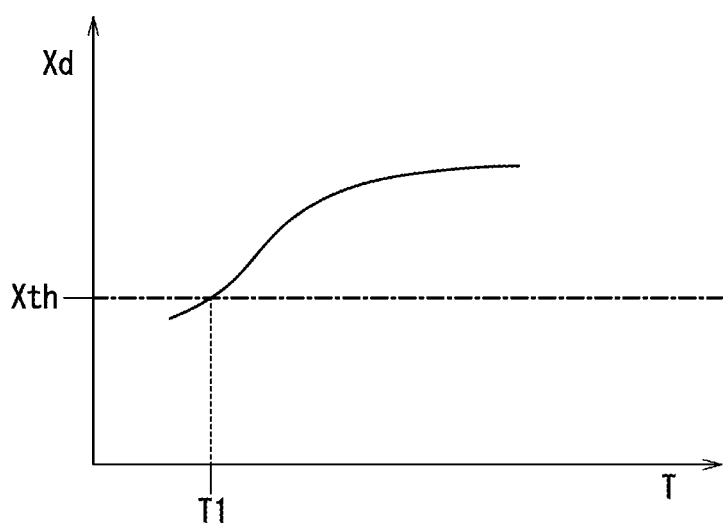
FIG. 9B shows a relationship between a fluctuation amount difference of a discharge current value, between the actual work data and the reference data, and the time.

FIG. 9A shows a relationship between the current difference Id, between the actual work data and the reference data, and the time T. FIG. 9B shows a relationship between a fluctuation amount difference Xd of the discharge current value, between the actual work data and the reference data, and the time T.

The abnormality detecting section 64 determines the data of the discharge current value included in the measurement data to be the actual work data. Furthermore, the abnormality detecting section 64 determines the fluctuation amount of the discharge current value within a prescribed time included in the measurement data to be the actual work data. The abnormality detecting section 64 calculates this fluctuation amount while shifting the measurement time for the discharge current value. The abnormality detecting section 64 compares the actual work data (discharge current value data) to the reference data (discharge current value data), and calculates the current difference Id that is the difference between these pieces of data. Furthermore, the abnormality detecting section 64 compares the actual work data (fluctuation amount data) to the reference data (fluctuation amount data), and calculates the fluctuation amount difference Xd that is the difference between these pieces of data. The abnormality detecting section 64 then determines that there is an abnormality if there is a time (time T1 in FIGS. 9A and 9B) at which the current difference Id exceeds the current threshold value Ith and the fluctuation amount difference Xd exceeds a fluctuation amount threshold value Xth.

6.7. Specific Example 7

Figure 10A:
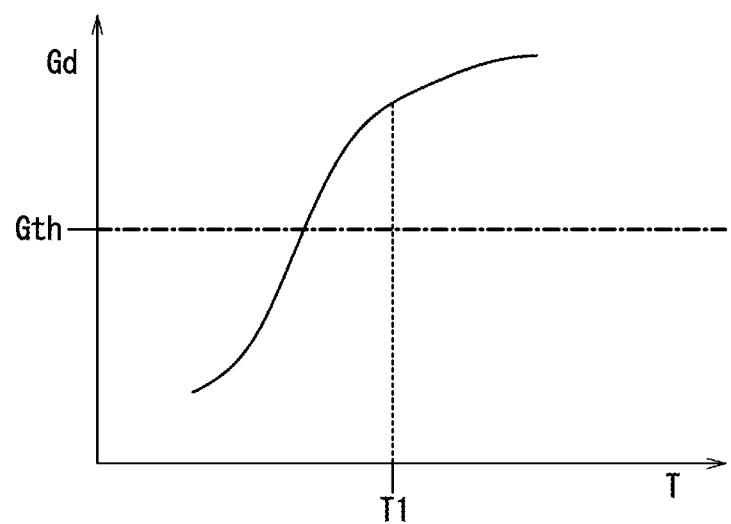
FIG. 10A shows a relationship between the acceleration difference, between the actual work data and the reference data, and the time.
Figure 10B:
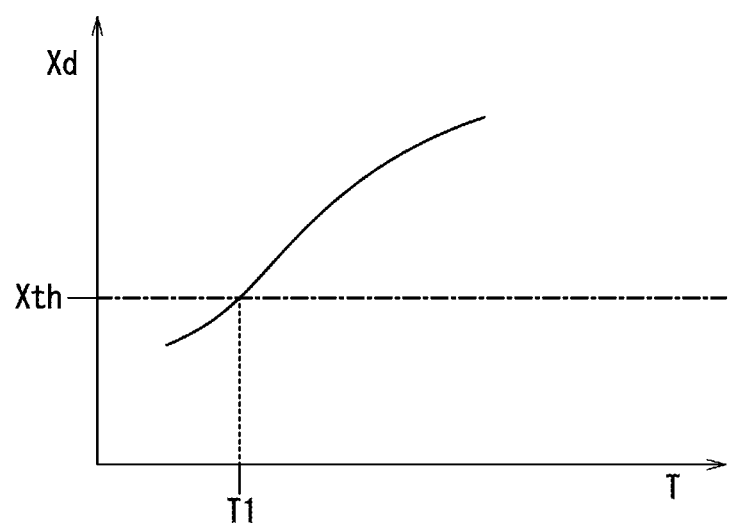
FIG. 10B shows a relationship between a fluctuation amount difference of the acceleration, between the actual work data and the reference data, and the time.

FIG. 10A shows a relationship between the acceleration difference Gd, between the actual work data and the reference data, and the time T. FIG. 10B shows a relationship between a fluctuation amount difference Xd of the acceleration, between the actual work data and the reference data, and the time T. Specific Example 7 simply involves replacing the discharge current value of Specific Example 6 with acceleration. Therefore, a description thereof is omitted.

6.8. Specific Example 8

The abnormality detecting section 64 may detect an abnormality if a difference between the work data and the reference data continues to exceed the threshold value for at least a prescribed determination time. For example, as shown in FIG. 8A, if the current difference Id continues to exceed the current threshold value Ith for a prescribed determination time (time T1 to time T2) from when the current difference Id exceeds the current threshold value Ith, the abnormality detecting section 64 detects an abnormality. The same is true for the case of the acceleration shown in FIG. 8B. The same is also true for the other examples.

The abnormality detecting section 64 is capable of performing a plurality of the functions shown in Specific Examples 1 to 8.

7. APPLICATION EXAMPLES

The following describes additional processes that can be performed by the abnormality detecting section 64 of the server 18.

7.1. Application Example 1

Figure 11:
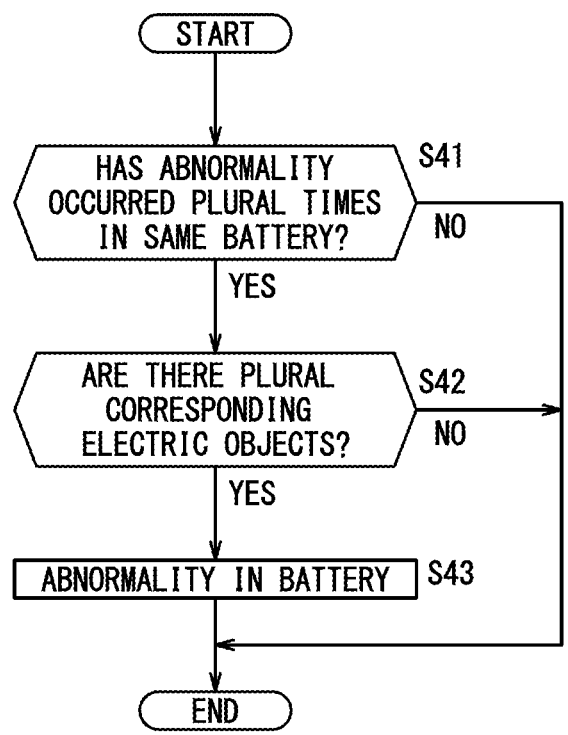
FIG. 11 is a flow chart of a process of Application Example 1.

FIG. 11 is a flow chart of a process of Application Example 1. A process for detecting that there is an abnormality in the detachable battery 14 is described as Application Example 1. The process shown in FIG. 11 is performed at any timing.

At step S41, the abnormality detecting section 64 determines whether an abnormality has occurred a plurality of times in the same detachable battery 14. Here, the abnormality detecting section 64 searches the history data stored in the server-side storage apparatus 60 and extracts all of the history data with an abnormality code appended thereto. Furthermore, if a plurality of pieces of history data having the same second identification code are extracted, the abnormality detecting section 64 determines that an abnormality has occurred a plurality of times in the detachable battery 14 identified by this second identification code. In this case (step S41: YES), the process moves to step S42. On the other hand, if an abnormality has not occurred a plurality of times in the same detachable battery 14 (step S41: NO), the process of Application Example 1 ends.

At step S42, the abnormality detecting section 64 determines whether there is one electric object 12 or a plurality of electric objects 12 that have had the detachable battery 14 identified by the second identification code of step S41 mounted therein. If a plurality of first identification codes are linked to the same second identification code in a plurality of pieces of history data, the abnormality detecting section 64 determines that there are a plurality of corresponding electric objects 12. In this case (step S42: YES), the process moves to step S43. On the other hand, if only one first identification code is linked to the same second identification code in the plurality of pieces of history data, the abnormality detecting section 64 determines that there is a single corresponding electric object 12. In this case (step S42: NO), the process of Application Example 1 ends.

At step S43, the abnormality detecting section 64 determines that there is an abnormality in the detachable battery 14 identified by the single second identification code included in the plurality of pieces of history data.

In this way, in Application Example 1, the abnormality detecting section 64 determines that there is an abnormality in the detachable battery 14 if an abnormality has been detected to have occurred a plurality of times in combinations of one detachable battery 14 and a plurality of electric objects 12.

7.2. Application Example 2

Figure 12:
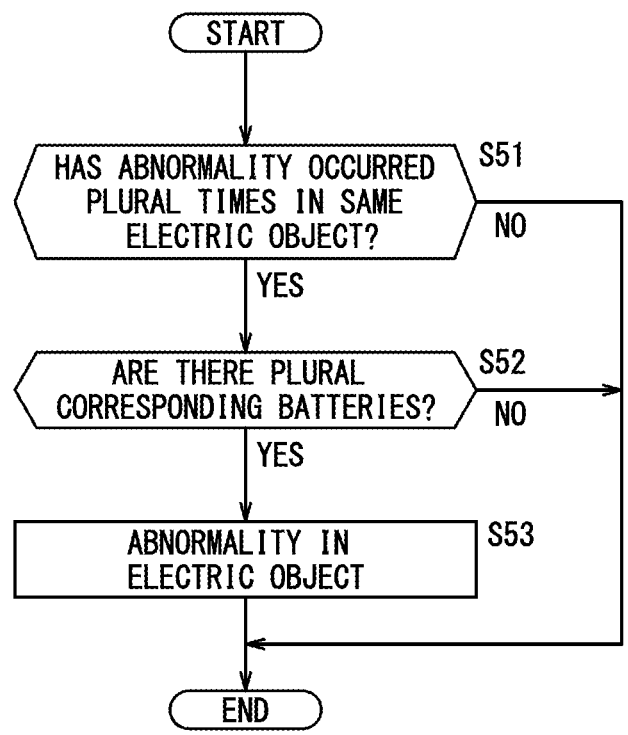
FIG. 12 is a flow chart of a process of Application Example 2.

FIG. 12 is a flow chart of a process of Application Example 2. A process for detecting that there is an abnormality in the electric object 12 is described as Application Example 2. The process shown in FIG. 12 is performed at any timing.

At step S51, the abnormality detecting section 64 determines whether an abnormality has occurred a plurality of times in the same electric object 12. Here, the abnormality detecting section 64 searches the history data stored in the server-side storage apparatus 60 and extracts all of the history data with an abnormality code appended thereto. Furthermore, if a plurality of pieces of history data having the same first identification code are extracted, the abnormality detecting section 64 determines that an abnormality has occurred a plurality of times in the electric object 12 identified by this first identification code. In this case (step S51: YES), the process moves to step S52. On the other hand, if an abnormality has not occurred a plurality of times in the same electric object 12 (step S51: NO), the process of Application Example 2 ends.

At step S52, the abnormality detecting section 64 determines whether there is one detachable battery 14 or a plurality of detachable batteries 14 that have been mounted in the electric object 12 identified by the first identification code of step S51. If a plurality of second identification codes are linked to the same first identification code in a plurality of pieces of history data, the abnormality detecting section 64 determines that there are a plurality of corresponding detachable batteries 14. In this case (step S52: YES), the process moves to step S53. On the other hand, if only one second identification code is linked to the same first identification code in the plurality of pieces of history data, the abnormality detecting section 64 determines that there is a single corresponding detachable battery 14. In this case (step S52: NO), the process of Application Example 2 ends.

At step S53, the abnormality detecting section 64 determines that there is an abnormality in the electric object 12 (including the electric power unit but excluding the detachable battery 14) identified by the single first identification code included in the plurality of pieces of history data.

In this way, in Application Example 2, the abnormality detecting section 64 determines that there is an abnormality in the electric object 12 if an abnormality has been detected to have occurred a plurality of times in combinations of one electric object 12 and a plurality of detachable batteries 14.

7.3. Other Application Examples

The abnormality detecting section 64 can analyze situations in which an abnormality occurs, for example, using the history data stored in the server-side storage apparatus 60.

8. MODIFICATION EXAMPLE

The abnormality detection system 10 described in the above embodiment provides a sharing service in which the detachable battery 14 is shared by a plurality of users. Instead, the abnormality detection system 10 may be a system (sales service) in which the user of each individual detachable battery 14 is determined. In such a case, instead of the battery exchange device 16, a charging device may be used that has only one slot 20. Furthermore, the battery exchange device 16 does not need to have a charging function. In such a case, the detachable battery 14 is stored in the battery exchange device 16 after being charged by a dedicated charging device.

In the abnormality detection system 10 described in the above embodiment, the battery exchange device 16 transmits the measurement data and the like to the server 18. Instead, the detachable battery 14 may have a communication function, and may transmit the measurement data and the like directly to the server 18.

9. TECHNICAL CONCEPTS OBTAINABLE FROM THE EMBODIMENT

The technical concepts that can be understood from the embodiment described above will be described below.

An aspect of the present invention is the abnormality detection system (10) that detects an abnormality in the electric object (12) or the detachable battery (14) that is attachable to and detachable from the electric object, the abnormality detection system comprising the server (18) provided separately from the electric object, wherein the detachable battery includes: the detecting unit (26); the battery-side acquiring section (34) that acquires the measurement data, which is data of the measurement value measured by the detecting unit, and also acquires, from the electric object, the first identification data for identifying the electric object; and the battery-side storage section (30) that stores the measurement data and the first identification data in a linked manner, and also stores the second identification data for identifying the detachable battery, and the server includes: the server-side storage section (60) that stores in advance the reference data, which is data acquired when the electric object performs the prescribed operation; the server-side acquiring section (62) that acquires the measurement data, the first identification data, and the second identification data; and the abnormality detecting section (64) that compares the actual work data obtained from the measurement data to the reference data, and detects an abnormality if the difference between the actual work data and the reference data exceeds the threshold value.

In the above configuration, the detachable battery 14 acquires data. Therefore, even though the electric object 12 does not have a function to acquire data, the server 18 can gather the data acquired by the detachable battery 14 and detect an abnormality occurring in the electric object 12 (including the electric power unit but excluding the detachable battery 14) or the detachable battery 14. In this case, the configuration of the electric object 12 becomes simple. That is, with the configuration described above, it is possible to detect an abnormality in the electric object 12 or in the detachable battery 14 mounted in the electric object 12, with a simple configuration.

Furthermore, if the detachable battery 14 is shared among a plurality of electric objects 12, an abnormality in each electric object 12 can be detected with a simple configuration.

With the above configuration, it is possible to identify the detachable battery 14 or the electric object 12 in which an abnormality has occurred, by using the first identification data and the second identification data.

With the above configuration, it is possible to preemptively prevent spreading of the abnormality, for example, spreading of malfunctioning of the electric object 12, by detecting an abnormality in the electric power unit mounted in the electric object 12.

The aspect of the present invention may comprise: one or more holding apparatuses (16) that are capable of holding the detachable battery removed from the electric object and of communicating with the server, wherein each of the holding apparatuses may include: the holding unit (20) that holds the detachable battery; the holding-apparatus-side acquiring section (50) that acquires the first identification data, the second identification data, and the measurement data from the battery-side storage section in a state where the detachable battery is attached to the holding unit; the communicating section (40) that transmits the first identification data, the second identification data, and the measurement data acquired by the holding-apparatus-side acquiring section, to the server; and the holding-apparatus-side storage section (44) that stores the measurement data acquired by the holding-apparatus-side acquiring section.

According to the configuration above, the detachable battery 14 does not need to have a function to transmit the measurement data and the like to a remote server 18. Therefore, with the above configuration, the configuration of the detachable battery 14 becomes simple.

In the aspect of the present invention, the holding-apparatus-side storage section may store the measurement data in time series; the holding-apparatus-side acquiring section may acquire the first time data indicating the timing at which the detachable battery is removed from the holding unit, and the second time data indicating the timing at which the detachable battery is attached to the holding unit; and for the same detachable battery, the server-side storage section may store, in a linked manner, the first time data, the measurement data in time series, and the second time data that are transmitted from the one or more holding units.

According to the above configuration, the clock 46 acquiring the timing (date and time) data is not needed for each individual detachable battery 14. Therefore, with the above configuration, the configuration of the detachable battery 14 becomes simple.

Furthermore, according to the above configuration, the measurement date and time for each measurement value is determined. Therefore, an operator on the server 18 side can improve the accuracy of the abnormality detection by setting a threshold value corresponding to the measurement date and time for each measurement value.

In the aspect of the present invention, the abnormality detecting section may identify the electric object based on the first identification data, identify the detachable battery based on the second identification data, and determine that there is an abnormality in the detachable battery if it is detected that an abnormality has occurred a plurality of times in combinations of one of the detachable batteries and a plurality of the electric objects.

In the aspect of the present invention, the abnormality detecting section may identify the electric object based on the first identification data, identify the detachable battery based on the second identification data, and determine that there is an abnormality in the electric object if it is detected that an abnormality has occurred a plurality of times in combinations of one of the electric objects and a plurality of the detachable batteries.

In the aspect of the present invention, the actual work data and the reference data may each include the data of the discharge current value of the detachable battery; and the electric object may be an electric work machine that performs a rated operation.

According to the above configuration, the abnormality detection becomes easy.

In the aspect of the present invention, the reference data may include the specified measurement data, which is data acquired when the electric object performs the specified operation included in the prescribed operation; and the abnormality detecting section may compare the specified measurement data to the actual work data obtained from the measurement data acquired when the electric object performs the specified operation.

According to the above configuration, the accuracy of the abnormality detection is improved.

In the aspect of the present invention, the operational mode of the electric object may be capable of being set, and the measurement mode in which the specified operation is performed may be included as the operational mode.

According to the above configuration, the abnormality detection becomes easier.

In the aspect of the present invention, the actual work data and the reference data may each include the data of the discharge current value of the detachable battery and the data of the acceleration experienced by the detachable battery; and the abnormality detecting section may detect an abnormality if the difference between the discharge current value of the actual work data and the discharge current value of the reference data exceeds the current threshold value and the difference between the acceleration of the actual work data and the acceleration of the reference data exceeds the acceleration threshold value.

According to the above configuration, the accuracy of the abnormality detection is improved compared to a case where only data of a single measurement item is used.

In the aspect of the present invention, the actual work data and the reference data may each include the data of the elapsed time from when the acceleration experienced by the detachable battery becomes greater than or equal to the prescribed acceleration to when the discharge current value of the detachable battery becomes greater than or equal to the prescribed current value; and the abnormality detecting section may detect an abnormality if the difference between the elapsed time of the actual work data and the elapsed time of the reference data exceeds the time threshold value.

According to the above configuration, the accuracy of the abnormality detection is improved compared to a case where only data of a single measurement item is used.

In the aspect of the present invention, the actual work data and the reference data may each include the data of the discharge current value of the detachable battery and the data of the fluctuation amount of the discharge current value within the prescribed time; and the abnormality detecting section may detect an abnormality if the difference between the discharge current value of the actual work data and the discharge current value of the reference data exceeds the current threshold value and the difference between the fluctuation amount of the actual work data and the fluctuation amount of the reference data exceeds the fluctuation amount threshold value.

According to the above configuration, the accuracy of the abnormality detection is improved compared to a case where only data of a single measurement item is used.

In the aspect of the present invention, the actual work data and the reference data may each include the data of the acceleration experienced by the detachable battery and the data of the fluctuation amount of the acceleration within the prescribed time; and the abnormality detecting section may detect an abnormality if the difference between the acceleration of the actual work data and the acceleration of the reference data exceeds the acceleration threshold value and the difference between the fluctuation amount of the actual work data and the fluctuation amount of the reference data exceeds the fluctuation amount threshold value.

According to the above configuration, the accuracy of the abnormality detection is improved compared to a case where only data of a single measurement item is used.

In the aspect of the present invention, the abnormality detecting section may detect an abnormality if the difference between the actual work data and the reference data continues to exceed the threshold value for at least the prescribed abnormality determination time.

According to the above configuration, it is possible to prevent detection of an abnormality caused by data having a momentarily abnormal value, and therefore the accuracy of the abnormality detection is improved.

It should be noted that the abnormality detection system according to the present invention is not limited to the above-described embodiment, and it goes without saying that various modifications could be adopted therein without departing from the essence and gist of the present invention.

The invention claimed is:

1. An abnormality detection system that detects an abnormality in a detachable battery that is attachable to and detachable from an electric object,
   the abnormality detection system comprising a server provided separately from the electric object, wherein
   the detachable battery includes:
   a detecting unit;
   a battery-side acquiring section configured to acquire measurement data, which is data of a measurement value measured by the detecting unit; and
   a battery-side storage section configured to store the measurement data acquired by the batter-side acquiring section and first identification data for identifying the electric object in a linked manner, and also store second identification data for identifying the detachable battery, and the server includes:

a server-side storage section configured to store in advance reference data, which is data acquired when the electric object performs a prescribed operation;

a server-side acquiring section configured to acquire the measurement data, the first identification data, and the second identification data stored in the battery-side storage section of the detachable battery; and an abnormality detecting section configured to compare data obtained from the measurement data acquired by the server-side acquiring section to the reference data stored in the server-side storage section, and detect an abnormality if a difference between the data obtained from the measurement data and the reference data exceeds a threshold value, wherein the abnormality detecting section identifies the electric object based on the first identification data, identifies the detachable battery based on the second identification data, and detects an abnormality in the detachable battery if abnormalities occur a plurality of times in combinations of the detachable battery being a single detachable battery and a plurality of the electric objects.

2. An abnormality detection system that detects an abnormality in an electric object, the abnormality detection system comprising:

a detachable battery that is attachable to and detachable from the electric object; and a server provided separately from the electric object, wherein the detachable battery includes:

a detecting unit;

a battery-side acquiring section configured to acquire measurement data, which is data of a measurement value measured by the detecting unit; and a battery-side storage section configured to store the measurement data acquired by the battery-side acquiring section and a first identification data for identifying the electric object in a linked manner, and also store second identification data for identifying the detachable battery, and the server includes:

a server-side storage section configured to store in advance reference data, which is data acquired when the electric object performs a prescribed operation;

a server-side acquiring section configured to acquire the measurement data, the first identification data, and the second identification data stored in the battery-side storage section of the detachable battery; and an abnormality detecting section configured to compare data obtained from the measurement data acquired by the server-side acquiring section to the reference data stored in the server-side storage section, and detect an abnormality if a difference between the data obtained from the measurement data and the reference data exceeds a threshold value, wherein the abnormality detecting section identifies the electric object based on the first identification data, identifies the detachable battery based on the second identification data, and detects an abnormality in the electric object if abnormalities occur a plurality of times in combinations of the electric object being a single electric object and a plurality of the detachable batteries.

3. The abnormality detection system according to claim 1, wherein the data obtained from the measurement data and the reference data each include data of a discharge current value of the detachable battery and data of acceleration experienced by the detachable battery; and the abnormality detecting section detects an abnormality if a difference between the discharge current value of the data obtained from the measurement data and the discharge current value of the reference data exceeds a current threshold value and a difference between the acceleration of the data obtained from the measurement data and the acceleration of the reference data exceeds an acceleration threshold value.

4. The abnormality detection system according to claim 1, wherein:

the data obtained from the measurement data and the reference data each include data of a discharge current value of the detachable battery and data of a fluctuation amount of the discharge current value within a prescribed time; and the abnormality detecting section detects an abnormality if a difference between the discharge current value of the data obtained from the measurement data and the discharge current value of the reference data exceeds a current threshold value and a difference between the fluctuation amount of the data obtained from the measurement data and the fluctuation amount of the reference data exceeds a first fluctuation amount threshold value.

5. The abnormality detection system according to claim 1, wherein:

the data obtained from the measurement data and the reference data each include data of acceleration experienced by the detachable battery and data of a fluctuation amount of the acceleration within a prescribed time; and the abnormality detecting section detects an abnormality if a difference between the acceleration of the data obtained from the measurement data and the acceleration of the reference data exceeds an acceleration threshold value and a difference between the fluctuation amount of the data obtained from the measurement data and the fluctuation amount of the reference data exceeds a second fluctuation amount threshold value.

6. The abnormality detection system according to claim 1, further comprising one or more holding apparatuses configured to hold the detachable battery removed from the electric object, and configured to communicate with the server, wherein each of the holding apparatuses includes:

a holding unit configured to hold the detachable battery;

a holding-apparatus-side acquiring section configured to acquire the first identification data, the second identification data, and the measurement data from the battery-side storage section in a state where the detachable battery is attached to the holding unit;

a communicating section configured to transmit to the server the first identification data, the second identification data, and the measurement data acquired by the holding-apparatus-side acquiring section; and a holding-apparatus-side storage section configured to store the measurement data acquired by the holding-apparatus-side acquiring section.

7. The abnormality detection system according to claim 6, wherein:
the holding-apparatus-side storage section stores the measurement data in time series;
the holding-apparatus-side acquiring section acquires first time data indicating a time at which the detachable battery is removed from the holding unit, and second time data indicating a time at which the detachable battery is attached to the holding unit; and
for a same detachable battery, the server-side storage section stores, in a linked manner, the first time data, the measurement data in time series, and the second time data that are transmitted from the one or more holding units.

8. The abnormality detection system according to claim 1, wherein:
the data obtained from the measurement data and the reference data each include data of a discharge current value of the detachable battery; and
the electric object is an electric work machine configured to perform a rated operation.

9. The abnormality detection system according to claim 1, wherein:
the reference data includes data acquired when the electric object performs a specified operation included in the prescribed operation; and
the abnormality detecting section compares the data obtained from the measurement data to the data acquired when the electric object performs the specified operation.

10. The abnormality detection system according to claim 9, wherein
the electric object is configure to set an operational mode for performing the specified operation.

11. The abnormality detection system according to claim 1, wherein
the abnormality detecting section detects an abnormality if the difference between the data obtained from the measurement data and the reference data continues to exceed a threshold value for at least a prescribed abnormality determination time.

12. The abnormality detection system according to claim 1, wherein
the battery-side acquiring section acquires the first identification data from the electric object.

13. The abnormality detection system according to claim 1, wherein
the battery-side acquiring section acquires the measurement data every prescribed time, and
the battery-side storage section stores the time-series measurement data acquired by the battery-side acquiring section.

14. A server that detects an abnormality in a detachable battery that is attachable to and detachable from an electric object, based on measurement data, which is data of a measurement value measured at the detachable battery, the server comprising:
a server-side storage section configured to store in advance reference data, which is data acquired when the electric object performs a prescribed operation;
a server-side acquiring section configured to acquire the measurement data measured at the detachable battery, first identification data for identifying the electric object, and second identification data for identifying the detachable battery; and
an abnormality detecting section configured to compare data obtained from the measurement data acquired by the server-side acquiring section to the reference data stored in the server-side storage section, and detect an abnormality if a difference between the data obtained from the measurement data and the reference data exceeds a threshold value,
wherein the abnormality detecting section identifies the electric object based on the first identification data, identifies the detachable battery based on the second identification data, and detects an abnormality in the detachable battery if abnormalities occur a plurality of times in combinations of the detachable battery being a single detachable battery and a plurality of the electric objects.

15. A server that detects an abnormality in an electric object, based on measurement data, which is data of a measurement value measured at a detachable battery that is attachable to and detachable from the electric object, the server comprising:
a server-side storage section configured to store in advance reference data, which is data acquired when the electric object performs a prescribed operation;
a server-side acquiring section configured to acquire the measurement data measured at the detachable battery, first identification data for identifying the electric object, and second identification data for identifying the detachable battery; and
an abnormality detecting section configured to compare data obtained from the measurement data acquired by the server-side acquiring section to the reference data stored in the server-side storage section, and detect an abnormality if a difference between the data obtained from the measurement data and the reference data exceeds a threshold value,
the abnormality detecting section identifies the electric object based on the first identification data, identifies the detachable battery based on the second identification data, and detects an abnormality in the electric object if abnormalities occur a plurality of times in combinations of the electric object being a single electric object and a plurality of the detachable batteries.

16. An abnormality detection method that detects an abnormality in a detachable battery that is attachable to and detachable from an electric object, the abnormality detection method comprising:
an acquiring step of acquiring measurement data, which is data of a measurement value measured at the detachable battery;
a first storing step of storing the measurement data acquired in the acquiring step and first identification data for identifying the electric object in a linked manner, and also storing second identification data for identifying the detachable battery;
a second storing step of storing in advance reference data, which is data acquired when the electric object performs a prescribed operation; and
an abnormality detecting step of comparing data obtained from the measurement data acquired in the acquiring step to the reference data stored in the second storing step, and detecting an abnormality if a difference between the data obtained from the measurement data and the reference data exceeds a threshold value,
wherein in the abnormality detecting step, the electric object is identified based on the first identification data, the detachable battery is identified based on the second identification data, and an abnormality is detected in the detachable battery if abnormalities occur a plurality of times in combinations of the detachable battery being a single detachable battery and a plurality of the electric objects.

17. An abnormality detection method that detects an abnormality in an electric object, the abnormality detection method comprising:
an acquiring step of acquiring measurement data, which is data of a measurement value measured at a detachable battery that is attachable to and detachable from the electric object;
a first storing step of storing the measurement data acquired in the acquiring step and first identification data for identifying the electric object in a linked manner, and also storing second identification data for identifying the detachable battery;
a second storing step of storing in advance reference data, which is data acquired when the electric object performs a prescribed operation; and
an abnormality detecting step of comparing data obtained from the measurement data acquired in the acquiring step to the reference data stored in the second storing step, and detecting an abnormality if a difference between the data obtained from the measurement data and the reference data exceeds a threshold value,
wherein in the abnormality detecting step, the electric object is identified based on the first identification data, the detachable battery is identified based on the second identification data, and an abnormality is detected in the electric object if abnormalities occur a plurality of times in combinations of the electric object being a single electric object and a plurality of the detachable batteries.

18. A non-transitory computer-readable medium storing a program, wherein the program causes a computer to execute the abnormality detecting method according to claim 16.

19. The abnormality detection system according to claim 2, wherein
the data obtained from the measurement data and the reference data each include data of a discharge current value of the detachable battery and data of acceleration experienced by the detachable battery, and
the abnormality detecting section detects an abnormality if a difference between the discharge current value of the data obtained from the measurement data and the discharge current value of the reference data exceeds a current threshold value and a difference between the acceleration of the data obtained from the measurement data and the acceleration of the reference data exceeds an acceleration threshold value.

20. The abnormality detection system according to claim 2, wherein
the data obtained from the measurement data and the reference data each include data of a discharge current value of the detachable battery and data of a fluctuation amount of the discharge current value within a prescribed time, and
the abnormality detecting section detects an abnormality if a difference between the discharge current value of the data obtained from the measurement data and the discharge current value of the reference data exceeds a current threshold value and a difference between the fluctuation amount of the data obtained from the measurement data and the fluctuation amount of the reference data exceeds a first fluctuation amount threshold value.

* * * * *